Dec. 30, 1952   A. E. WHITTINGTON   2,623,705
CASTING REEL
Filed Oct. 5, 1950   2 SHEETS—SHEET 1
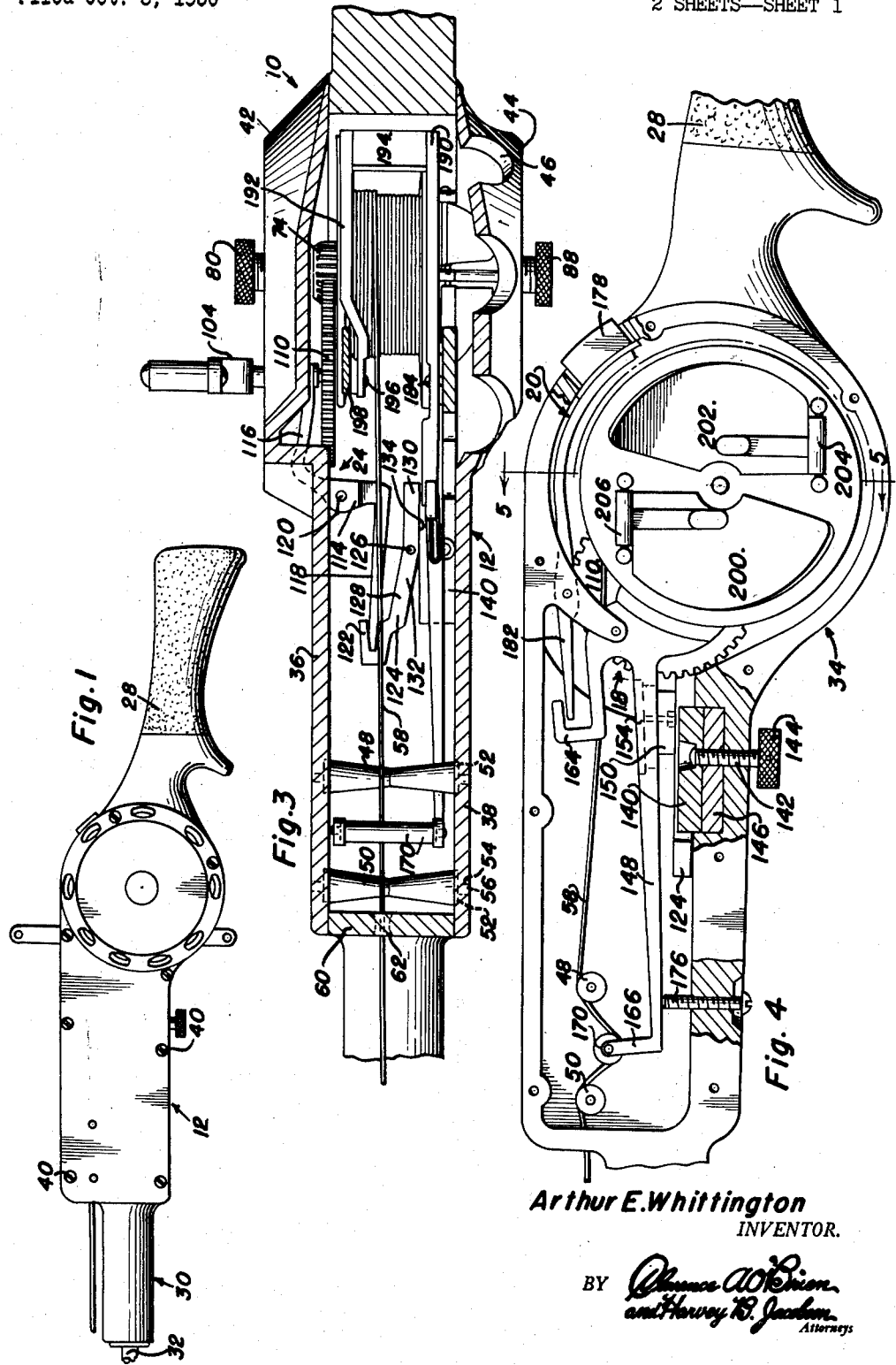
Arthur E. Whittington
INVENTOR.

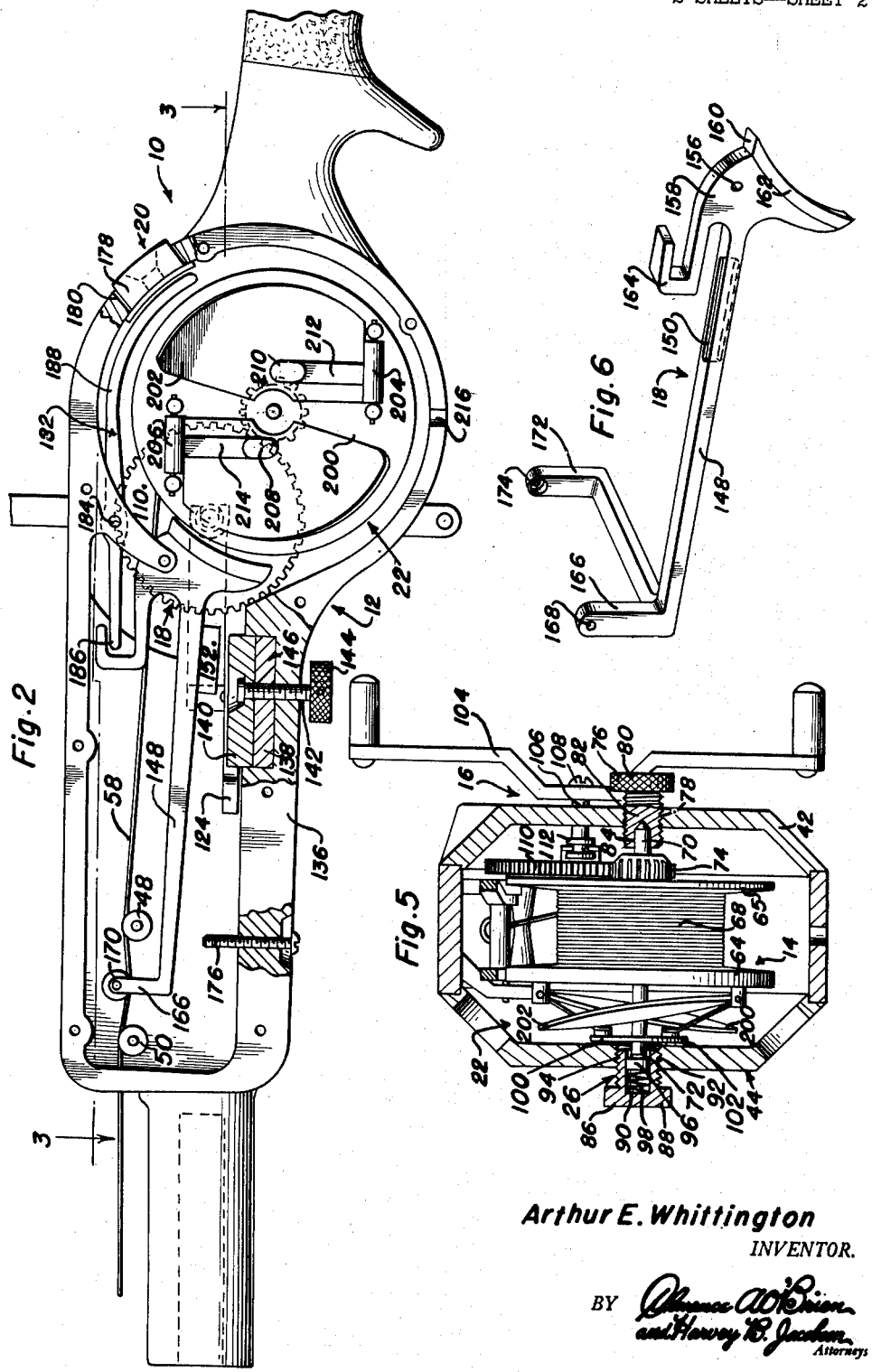

Patented Dec. 30, 1952

2,623,705

UNITED STATES PATENT OFFICE 2,623,705

CASTING REEL

Arthur E. Whittington, Elkhart, Ind.

Application October 5, 1950, Serial No. 188,559

6 Claims. (Cl. 242—84.5)

The present invention relates to improvements in casting reels and more particularly to the type wherein provision is made for automatically braking the reel when the weight on the end of the line strikes the water.

An object of the present invention is to provide an improved casting reel which is adapted to freely permit the egress of the line from the reel during casting and wherein manual means are provided for maintaining an automatic brake out of contact with the reel.

A further object of the present invention resides in the provision of novel automatic braking means whereby slackening of the line will effect contact between a brake band and the reel to prevent further rotation of the reel and to further prevent the line from continuing its egress whereby fouling of the line may be prevented.

Still another object of the present invention is to provide a means whereby the reel may be manually rotated for winding the line thereon and wherein the reel may be freely rotatable with respect to the manual winding means when it is desired to cast the line without accompanying rotation of the manual means.

Various other objects and advantages will become apparent from the detailed description to follow. The best form in which I have contemplated applying my invention is clearly illustrated in the accompanying drawings, wherein:

Figure 1 is a side elevational view of the entire structure of the present invention;

Figure 2 is a side elevational view similar to Figure 1 with the side plate covering the housing being removed and with parts in section;

Figure 3 is a horizontal longitudinal sectional view taken substantially along the line 3—3 of Figure 2;

Figure 4 is a side elevational view similar to Figure 2 but wherein the braking means is shown in contact with the reel when the line is in its slackened position;

Figure 5 is a vertical sectional view taken substantially along the line 5—5 of Figure 4; and Figure 6 is a detail perspective view of the lever means provided with the brake means on one end.

Referring more particularly to the drawings, wherein like numerals designate like parts throughout, the numeral 10 designates generally the casting reel of the present invention which is mounted in a housing designated generally by the numeral 12. The casting reel 10 is formed of a reel 14 which is rotatable by means of the manual winding means 16, an automatic brake means 18, a manually operable release means 22 for maintaining the automatic brake means 18 in inoperative position, a second automatic brake means 22 which is adapted to limit the speed of rotation of the reel means 14, a lever means 24 which is adapted to maintain the manually operated means 16 in each of two positions for providing free rotation of the reel 14 when desired, and finally, a bearing support means for the reel 14.

As seen in Figure 1, the fishing rod comprises a handle portion 28 which is of pistol grip form, a housing 12 and a barrel portion 30 from which extends the rod 32. The housing 12 is of elongated form, having open side walls and an enlarged portion 34 which is circular in cross section and adapted to receive the reel means 14. The housing 12 is formed with open sides and a pair of plates 36 and 38 are securely positioned over the open sides by means of the screws 40 to complete the housing. The side walls 36 and 38 are provided with projecting portions 42 and 44 which are adapted to overlie the enlarged portion 34 of the housing 12 and which provide supporting means for the bearing structure 26. The projecting portion 44 is provided with a plurality of openings 46 to provide communication between the interior of the housing and the atmosphere.

At the forward end of the housing 12, a pair of rollers 48 and 50 are provided. The rollers 48 and 50 are circular in cross section and gradually reduce in diameter towards their central portions. As seen best in Figure 3, the walls 36 and 38 are provided with recesses 52 and bores 54 for receiving the ends of the rollers 50 and the pins 56 integrally formed therewith. Thus, it will be seen that the rollers 48 and 50 are free to rotate within the housing but are arranged so that the extremities thereof will be free from fouling with the line 58 which is adapted to pass over the central portions of the rollers. The forward wall 60 of the housing 12 is provided with an opening 62 through which the line 58 may pass.

The line 58 is adapted to be wound on the reel 14 which essentially is comprised of a pair of disks 64 and 66, a spindle portion 68 and axially extending rods 70 and 72 which are adapted to rotate with the reel 14. Integrally formed on the rod 70 is a gear 74.

The bearing supporting means 26 for the casting reel 14 is best disclosed in Figure 5. One of the bearing elements 76 is threadedly engaged in the threaded opening 78 in the side wall of the housing 12 and is comprised of an enlarged head portion 80 which is knurled for gripping and a reduced externally threaded portion 82 which is provided with a bearing recess 84 for receiving the rod 70.

The second bearing element 86 is formed with a knurled head 88, a cylindrical recess 90 and an externally threaded portion 92 for threaded engagement within the threaded opening 94 in the side wall of the housing 12. A piston 96 is reciprocably mounted within the cylindrical recess 90 and a spring 98 is positioned within the recess for normally urging the piston 96 outwardly against the juxtaposed end of the rod 72. A disk 100 is secured to the inner surface of the projecting portion 44 by means of screws or the like at 102. The center portion of the disk 100 is provided with an opening for rotatably receiving the rod 72 for maintaining it in axial alignment within the housing. The disk 100 also serves as a brake contacting surface which will more fully be described hereinafter.

The means for actuating the reel 14 designated generally by the numeral 16 is comprised of a handle member 104 which is secured on the end of the pin 106 by means of the screw 108. The pin 106 extends through the enlarged portion 42 of the housing 12 and has integrally formed on its inner end a spur gear 110 which is adapted to mesh with the gear 74 whereby rotation of the handle 104 will effect rotation of the reel 14 through the pre-selected gear ratio between the gears 110 and 74. The pin 106 is provided with a grooved element 112 which is adapted to move axially with the pin 106 when the pin is moved outwardly with the handle 104 to remove the gear 110 for engagement with the gear 74 when it is desired to permit the reel 14 to rotate freely during casting.

A means is provided for maintaining the gear 110 in either of its two positions, that is, in engagement with the gear 74 and disengaged from the gear 74. This means is designated generally by the numeral 24 and is shown best in Figure 3 as comprising a lever 114 having a pair of offset end portions 116 and 118 in substantially parallel relation to each other, the lever being rotatably disposed on the pin 120 supported by the housing. The extremity of the end portion 116 is notched and received in the grooved portion of the element 112 on the pin 106 whereby the lever 114 may be pivoted in response to outward movement of the handle 104. The free end of the portion 118 of the lever 114 is engaged in the angulated end 122 of a second lever 124 rotatably disposed on the pin 126. The second lever 124 is provided with a pair of angulated portions 128 and 130 which are disposed on opposite sides of the pin 126 and are provided with faces 132 and 134 in angular relation to each other. The portions 128 and 130 of the lever 124 are formed of a magnetic material for a purpose to be presently described.

Looking now at Figure 2, it will be seen that the bottom portion 136 of the housing 12 is provided with a recess at 138 whereby a magnet 140 which is held therein by means of the retaining screw 142 having the knurled head 144 positioned on the exterior of the housing 12. A compressible spacer 146 underlies the magnet 140 in the recess 138 to permit adjustment of the magnet with respect to the recess.

Looking once again at Figure 3, it will be seen that the lever 124 is juxtaposed to the magnet 140 and a selected one of the faces 132 or 134 is adapted to magnetically engage the magnet 140 to retain the lever 124 in each of its two positions with the result that the lever 114 is also maintained in one of its two positions. Thus, it will be seen that the gear 110 may be maintained in engagement with the gear 74 or out of engagement with the gear 74 by the magnetic bar 140 and lever 124.

The automatic brake means 18 which is adapted to frictionally engage the reel 14 as the line 58 slackens is comprised of a lever which is best shown in perspective in Figure 6. The lever is comprised of an elongated shank portion 148 having a slot 150 therein whereby a magnet may be adjustably secured to the underside of the shank portion 148. Figure 4 shows the magnet 152 secured on the shank portion 148 by the screw 154 positioned within the slot 150. The lever is provided with an aperture 156 in the enlarged portion 158 at one end of the shank 148 for pivotally mounting the lever within the housing 12. A brake band 160 is secured to the arcuate face 162 of the enlarged portion 158 and adapted to engage the disk 64 of the reel 14 for a braking action. The enlarged portion 158 is also formed with a substantially U-shaped extension 164 which substantially overlies the shank portion 148 at one end and is provided for a purpose to be hereinafter described.

The opposite end of the shank 148 is angulated at 166 and provided with an aperture 168 which forms a bearing for one end of the roller 170. An L-shaped element 172 extends laterally from the shank 148 at the angulated end 166 and has a bearing recess 174 in alignment with the aperture 168 to provide a bearing for the other end of the roller 170.

As seen best in Figures 2 and 4, the roller 170 is adapted to be positioned between the rollers 48 and 50 and on the opposite side of the line 58, being supported thereby when the line is taut. The magnet 152 is juxtaposed to the magnet 140 whereby the lever of the automatic brake means 18 will be pivoted towards the magnet 140 as the line 58 becomes slackened, thereby effecting contact between the brake band 160 and the periphery of the disk 64 of the reel 14. The housing 12 is provided with a stop screw 176 which is adapted to underlie the shank 148 to prevent its downward pivoting movement.

The finger operated means 24 manually deactivating the automatic brake means 18 is comprised of a plunger 178 extending through an opening 180 in the housing 12 at a position convenient for contact by a finger of the hand holding the handle 28. A lever 182 is pivoted within the housing on the pin 184 and has one end 186 received between the U-shaped extension 164 of the automatic brake means 18. The opposite end of the lever 182 is arcuated at 188 to overlie the reel 14 and has its terminal portion underlying the plunger 178 whereby inward movement of the plunger effects pivoting of the lever 182 which in turn effects pivoting of the automatic brake means 18 to its brake disengaged position. Figure 3 shows the lever 182 with the arcuated end 188 consisting of a pair of arcuated elements 190 and 192 jointed at their extremities by the plate 194 underlying the plunger 178. The arcuated elements 190 and 192 are pivotally mounted on the pin 184 and 196 respectively. The pin 196 is supported by the plate 198 which extends downwardly from the upper wall of the housing 12.

The automatic brake means 22 for limiting the rotational speed of the reel 14 is comprised of a pair of sector plates 200 and 202 which are resiliently mounted in angular relation to the face of the disk 64 by means of the mounting elements 204 and 206. A pair of brake pads 208 and 210 are mounted in spaced relation to the sectors 200 and 202 by the resilient flexible arms 212 and 214 which have their fixed ends secured to the mounting elements 204 and 206 respectively. The brake pads 208 and 210 are juxtaposed to the face of the disk 100 hereinabove described. It will thus be seen that as the reel 14 rotates upon casting, the blades 200 and 202 will move outwardly in response to the wind resistance afforded thereby. The outward movement of the blades will effect outward pivoting of the brake pads 208 and 210 whereby contact will be made with the disk 100. The friction between the pads 208 and 210 and the disk 100 increases the frictional resistance as the rotational speed of the reel increases beyond a predetermined amount.

Figure 2 shows the housing 12 being formed with a vent hole 216 to permit drainage of the housing should any moisture collect therein.

From the foregoing description, taken in conjunction with the drawings, it is believed that a casting reel has been provided which will accomplish all of the objects hereinabove set forth. Inasmuch as the operation of the casting reel should be obvious to one skilled in the art, a detailed description thereof is deemed unnecessary. When it is desired to cast, the handle 104 is moved outwardly disengaging the gear 110 from the gear 74, it being held in this position by means of the contact between the magnet 140 and the face 134 of the lever 124. The rod may be manipulated to cast the line which will unwind from the freely rotatable reel 14. At the time of casting, one finger is pressed against the plunger 178 to maintain the automatic braking means 18 out of contact with the reel 14. As the line 58 is unwinding, the finger may be released from the plunger 178 and the brake band 160 will be maintained out of contact with the disk 64 by means of the support afforded by the line 58 underneath the roller 170. Should the reel 14 be unwinding at too high a rate, the automatic braking means 22 automatically operates in response to the wind resistance of the blades 200 and 202 to outwardly move the brake pads 208 and 210 into contact with the disk 100, thereby limiting the rotational speed of the reel 14. When the bait strikes the water, the line 58 will immediately slacken permitting downward movement of the roller 170 to the position shown in Figure 4, thereby permitting contact between the brake band 160 and the disk 64. The magnet 140 will attract the magnet 152 to urge the continued contact between the brake band 160 and the disk 64. This will effect a stoppage of the unwinding of the line 58 and prevent fouling.

Having described the invention, what is claimed as new is:

1. A casting reel comprising a housing having a reel rotatably disposed therein, a pair of spaced rollers mounted in the housing, and an automatic brake means mounted in said housing and engageable with said reel upon slackening of the line, the line being wound on said reel and extending out of one end of said housing, an intermediate portion of said line passing over the pair of spaced rollers, said automatic brake means including a lever pivotally mounted within said housing and having a brake band integrally formed with one end for engaging the reel, the other end of said lever being provided with a roller disposed between said pair of rollers and on the opposite side of said line whereby when said line is taut, the brake band will be out of engagement with said reel and when the line slackens, the lever will pivot to effect contact between the brake band and reel, said lever being provided with a first magnetic element, a second magnetic element adjustably mounted in said housing in juxtaposition to said first magnetic element and adapted to magnetically urge said lever to brake contacting position and retain said lever in its brake contacting position.

2. A casting reel comprising a housing having a reel rotatably disposed therein, a pair of spaced rollers mounted in the housing, and an automatic brake means mounted in said housing and engageable with said reel upon slackening of the line, the line being wound on said reel and extending out of one end of said housing, an intermediate portion of said line passing over the pair of spaced rollers, said automatic brake means including a lever pivotally mounted within said housing and having a brake band integrally formed with one end, the other end of said lever being provided with a roller disposed between said pair of rollers and on the opposite side of said line whereby when said line is taut, the brake band will be out of engagement with said reel and when the line slackens, the lever will pivot to effect contact between the brake band and reel, and a finger operated means actuatable to pivot said lever to a first position with the brake band out of contact with the reel, said finger operated means including a rockable member pivotally mounted in the housing, said lever including a U-shaped intermediate portion engaging said rockable member.

3. A casting reel comprising a housing having a reel rotatably disposed therein, a pair of spaced rollers mounted in the housing, and an automatic brake means mounted in said housing and engageable with said reel upon slackening of the line, the line being wound on said reel and extending out of one end of said housing, an intermediate portion of said line passing over the pair of spaced rollers, said automatic brake means including a lever pivotally mounted within said housing and having a brake band integrally formed with one end, the other end of said lever being provided with a roller disposed between said pair of rollers and on the opposite side of said line whereby when said line is taut, the brake band will be out of engagement with said reel and when the line slackens, the lever will pivot to effect contact between the brake band and reel, and a finger operated means, said finger operated means including a second lever pivotally mounted in said housing and having an arcuated end overlying said reel, a plunger freely mounted in said housing and engageable with said arcuated portion, the other end of said second lever being adapted to contact the first mentioned lever for pivoting the same to its first position with the brake band out of contact with the reel.

4. A casting reel comprising a housing having a reel rotatably disposed therein, a pair of spaced rollers mounted in said housing, and an automatic brake means mounted in said housing and engageable with said reel upon slackening of the line, the line being wound on said reel and extending out of one end of said housing, an intermediate portion of said line passing over the pair of spaced rollers, said automatic brake means including a lever pivotally mounted within said housing and having a brake band integrally formed with one end, the other end of said lever being provided with a roller disposed between said pair of rollers and on the opposite side of said line whereby when said line is taut, the brake band will be out of engagement with said reel and when the line slackens, the lever will pivot to effect contact between the brake band and reel, said lever being formed with an offset U-shaped intermediate portion, and a finger operated means, including a rockable member having an end engaging said offset portion to pivot said lever to a first position with the brake band out of contact with the reel.

5. A casting reel comprising a housing having a reel rotatably disposed therein, a pair of spaced rollers mounted in the housing, and an automatic brake means mounted in said housing and engageable with said reel upon slackening of the line, the line being wound on said reel and extending out of one end of said housing, an intermediate portion of said line passing over the pair of spaced rollers, said automatic brake means including a lever pivotally mounted within said housing and having a brake band integrally formed with one end, the other end of said lever being provided with a roller disposed between said pair of rollers and on the opposite side of said line whereby when said line is taut, the brake band will be out of engagement with said reel and when the line slackens, the lever will pivot to effect contact between the brake band and reel, said lever being formed with an offset angulated portion, and a finger operated means, said finger operated means including a second lever mounted in said housing and having an arcuated end overlying said reel, a plunger freely mounted in said housing and engageable with said arcuated portion, the other end of said second lever being adapted to contact the offset portion of said first mentioned lever to pivot the same to a first position with the brake band out of contact with the reel.

6. A casting reel comprising a housing having a reel rotatably disposed therein, and an automatic brake means mounted in said housing and responsive to slackening of the line for braking the rotational movement of said reel, and manually operable means for effecting rotation of said reel, said last named means including a first gear on the spindle of said reel, a second gear mounted on a pin rotatably and reciprocably disposed in said housing, a handle on said pin for effecting rotation of said second gear and for reciprocating the same into and out of engagement with said first gear, and means for maintaining said pin in its inner and outer positions, said last named means including a lever having a pair of offset end portions, one of said end portions being movable with said pin, the other of said end portions being engageable with one end of a second lever, said second lever having a pair of faces angularly disposed with respect to each other and disposed on each side of the pivotal axis of said second lever, a magnetic bar secured within said housing and juxtaposed to said pair of faces whereby said second lever may be pivoted to a first and second position with said faces selectively maintained in magnetic contact with said magnetic bar, said automatic brake means including a rockable lever pivoted in said housing and movable into and out of braking engagement with the reel, and a magnet supported by said rockable lever and attracted to said magnetic bar for movement into engagement with said reel.

ARTHUR E. WHITTINGTON.

REFERENCES CITED

The following references are of record in the file of this patent:

UNITED STATES PATENTS

| Number | Name | Date |
|---|---|---|
| 496,654 | Heskett | May 2, 1893 |
| 506,094 | Boardman | Oct. 3, 1893 |
| 1,892,541 | Smelser | Dec. 27, 1932 |
| 1,952,756 | Henze | Mar. 27, 1934 |
| 2,059,519 | Harris | Nov. 3, 1936 |
| 2,188,062 | Schroder | Jan. 23, 1940 |
| 2,384,561 | Muffett | Sept. 11, 1945 |

FOREIGN PATENTS

| Number | Country | Date |
|---|---|---|
| 5,531 | Great Britain | Nov. 5, 1914 |